(12) United States Patent
Sabi

(10) Patent No.: US 6,451,424 B1
(45) Date of Patent: Sep. 17, 2002

(54) MAGNETO-OPTICAL RECORDING MEDIUM AND METHOD OF MANUFACTURING THE SAME

(75) Inventor: Yuichi Sabi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/496,795

(22) Filed: Feb. 2, 2000

(30) Foreign Application Priority Data

Feb. 3, 1999 (JP) .......................................... P11-026521

(51) Int. Cl.[7] .................................................. G11B 5/66
(52) U.S. Cl. ................ 428/332; 428/336; 428/694 ML; 428/900; 427/128; 427/129; 427/130
(58) Field of Search .................. 428/694 ML, 900, 428/332, 336; 427/128–130

(56) References Cited

U.S. PATENT DOCUMENTS

| | | | | |
|---|---|---|---|---|
| 5,700,565 A | * | 12/1997 | Kitaguchi et al. | .......... 428/332 |
| 5,952,094 A | * | 9/1999 | Kesteren et al. | ............ 428/332 |
| 5,965,286 A | * | 10/1999 | Ohnuki et al. | .............. 428/332 |
| 5,976,688 A | * | 11/1999 | Kawase et al. | ...... 428/694 ML |

* cited by examiner

Primary Examiner—Leszek Kiliman
(74) Attorney, Agent, or Firm—Sonnenschein, Nath & Rosenthal

(57) ABSTRACT

The object of the present invention is to improve the thermal properties while maintaining the optical performance index. In the constitution having the light-permeable first dielectric layer, magneto-optical recording layer, light-permeable metal layer 1 nm to 10 nm in thickness and having layer heat diffusion as compared with the magneto-optical recording layer, light-permeable second dielectric layer, and metal reflecting film laminated sequentially from the light incidence side, an appropriate Kerr enhancement effect is obtained, the optical performance index is maintained, and temperature rise can be suppressed.

7 Claims, 4 Drawing Sheets

MAGNETO-OPTICAL RECORDING MEDIUM AND METHOD OF MANUFACTURING THE SAME

RELATED APPLICATION DATA

The present application claims priority to Japanese Application No. P11-026521 filed Feb. 3, 1999 which application is incorporated herein by reference to the extent permitted by law.

BACKGROUND OF THE INVENTION

1. Technical Field

The present invention relates to a magneto-optical recording medium, and a method of manufacturing the same.

2. Description of the Related Art

An ordinary magneto-optical recording medium, for example, a magneto-optical disk is composed as shown in a schematic sectional view in FIG. 6, in which a light-permeable first dielectric layer 2 of SiN and 80 nm to 100 nm in thickness, a magneto-optical recording layer 3 of, for example, TbFeCo, a light-permeable second dielectric layer 4 of SiN and 20 nm to 40 nm in thickness, and a metal reflecting film 5 of Al and 50 nm to 60 nm in thickness are sequentially laminated on, for example, a light-permeable substrate 1.

In the magneto-optical recording medium having the structure as shown in FIG. 6, the light L enters from the substrate 1 side.

The magneto-optical recording layer 3 comes to have light permeability as its thickness is defined less than 30 nm, for example, 15 nm to 25 nm, and by making use of multiple interference with the metal reflecting film 5, an enhancement effect of Kerr effect is obtained, and therefore while keeping constant the optical performance index, that is, $R \cdot \theta_K$ (R: reflectivity, $\theta_K$: Kerr rotational angle), the reflectivity R can be lowered, and an optimum thermal design is realized by combination with the metal reflecting film.

First, its optical aspect is explained. If the performance index remains constant when the film composition is changed, the signal amplitude and disk noise keep a constant level, and the S/N is not changed. However, in a magneto-optical disk, shot noise is dominant in the high frequency region. Since the shot noise level is proportional to the square root of the quantity of detected light on the detector for detecting a signal, the noise level is lower as the reflectivity is lower. As far as thermal properties and servo characteristics permit, the S/N is raised in the design of lower reflectivity.

To lower the reflectivity, it may be realized in a structure in which a SiN dielectric layer and a thick magneto-optical recording layer are applied on a substrate. In this case, however, if the thickness of the SiN dielectric layer is changed, the reflectivity is not lower than 20%. To further lower the reflectivity, it is effective to form the magneto-optical recording layer in a thickness of less than 30 nm, and dispose the reflecting films sandwiching the dielectric layer. In particular, when the thickness of the magneto-optical recording layer is less than 20 nm, the light transmittance is raised, and by making use of the multiple interference with the reflecting film, the reflectivity can be varied in a wider range. As the reflecting film, generally, a high reflectivity metal mainly composed of Al is used.

Next, the thermal aspect is explained. From the thermal aspect, by properly selecting the thickness of the metal reflecting film and the film thickness of the second dielectric layer, the thermal properties are controlled. However, since the light spot size is made smaller in diameter due to the recent high density trend of magneto-optical disks, if the reproduction light intensity is raised, there occurs a problem that the recorded marks may be erased, for example, by repeated reproductions. In particular, in a short wavelength light source, since the light absorption is concentrated on the surface of the magneto-optical recording layer, the temperature of the magneto-optical recording layer rises before the heat reaches the metal reflecting film, and therefore in the conventional film composition, the thermal characteristics cannot be controlled.

Generally, when the film thickness is reduced in a metal film, the mean free path of electrons is smaller and heat conduction declines, and it is known that the heat conduction drops suddenly when the film thickness is smaller than about 30 nm. It is no exception in the magneto-optical recording layer of metal film such as TbFeCo, and therefore if attempted to maintain the optical characteristics by defining the film thickness at less than 30 nm, the problem is the temperature rise due to a drop in heat conduction.

That is, in the magneto-optical recording medium, the optical performance index and suppression of temperature rise are contradictory problems.

SUMMARY OF THE INVENTION

Therefore, relating to the magneto-optical recording medium, it is an object of the invention to present a magneto-optical recording medium capable of improving the thermal properties while maintaining the optical performance index, and a method of manufacturing the same.

The magneto-optical recording medium of the invention is formed by laminating a light-permeable first dielectric layer, a magneto-optical recording layer, a light-permeable metal layer of 1 nm to 10 nm in thickness and having larger heat diffusion as compared with the magneto-optical recording layer, a light-permeable second dielectric layer, and a metal reflecting layer, sequentially from the light incidence side.

The method of manufacturing a magneto-optical recording medium of the invention comprises steps of forming a light-permeable first dielectric layer, a magneto-optical recording layer, and a metal layer of 1 nm to 10 nm in thickness and having a larger heat diffusion as compared with the magneto-optical recording layer sequentially on a light-permeable base material, a step of smoothing the surface of the light-permeable metal layer having large heat diffusion compared with the magneto-optical recording layer after the film forming steps, and a step of forming a light-permeable second dielectric layer and metal reflecting layer sequentially afterwards, whereby the light enters the magneto-optical recording medium from the light-permeable base material side.

Also, the method of manufacturing a magneto-optical recording medium of the invention comprises a step of respectively forming a metal reflecting layer, a light-permeable second dielectric layer and a metal film having large heat diffusion compared with the magneto-optical recording layer sequentially on a base material, a step of smoothing the surface of the light-permeable metal layer after the film forming step, and a step of forming a magneto-optical recording layer and a light-permeable first dielectric layer sequentially afterwards. Thus, the light enters the magneto-optical recording medium from the opposite side of the light-permeable base material side.

In the invention, the transmission means a specific light-permeable characteristic of reproducing light radiated to a magneto-optical recording medium.

According to the magneto-optical recording medium of the invention, between the magneto-optical recording layer and the metal reflecting film, a metal layer is placed in contact with the magneto-optical recording layer by selecting the film thickness in a range of 1 nm to 10 nm so as to be light-permeable, and having a larger heat diffusion as compared with the magneto-optical recording layer, and therefore while maintaining the optical index, this metal layer is responsible for heat conduction of conduction electrons, and the effective heat diffusion in the magneto-optical recording layer is enhanced, so that the thermal properties may be enhanced.

According to the manufacturing method of the invention, which includes a surface treatment step of smoothing the surface of the magneto-optical recording layer, increase of noise due to worsening of the surface properties can be avoided.

DETAILED DESCRIPTION OF THE PREFERRED EMBODIMENT

Figure 1:
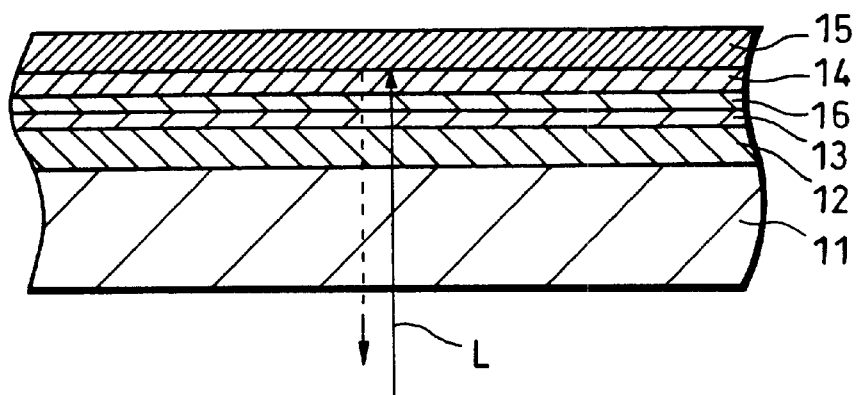
FIG. 1 is a schematic sectional view of an example of a magneto-optical recording medium according to the invention.

An embodiment of a magneto-optical recording medium of the invention is described below. FIG. 1 is a schematic sectional view showing an example of the magneto-optical recording medium. In the embodiment, the light L is radiated from the base material 11 side.

The invention is described while referring to FIG. 1 below, but it must be noted that it is not limited to the illustrated example alone.

For example, on a light-permeable base material 11 made of a glass substrate, another plastic substrate of an epoxy resin and the like, or a protective layer, a light-permeable first dielectric layer 12, a magneto-optical recording layer 13, a light-permeable metal layer, a light-permeable second dielectric layer 14, and a metal reflecting film 15 are laminated in this sequence.

Herein, the first and second dielectric films 12 are set at a specific film thickness, depending on the wavelength of the light source to be used, so that an appropriate enhancement effect may be obtained.

These first and second dielectric layers 11 and 12 are made of, for example, SiN, and the first dielectric layer 11 can be selected in a thickness of 60 nm to 100 nm, and the second dielectric layer 14 is selected, for example, in a thickness of 20 nm to 40 nm.

The magneto-optical recording layer 13 is composed of, for example, a TbFeCo layer, and its film thickness is selected smaller than 30 nm, preferably around 20 nm, that is, 15 nm to 25 nm, from the viewpoint of reduction of reflectivity in order to lower the shot noise level as mentioned above.

The light permeable metal layer 16 is composed of a metal material of larger heat diffusion as compared with the magneto-optical recording layer 12 and having high light reflectivity, and it is disposed in contact with the magneto-optical recording layer 13 at the opposite side of the light incidence side.

Since this light permeable metal layer 16 is disposed adjacently to the magneto-optical recording layer 13, it has the role of sharing the heat conduction electrons with the magneto-optical recording layer 13. That is, the electrons responsible for heat conduction can conduct beyond the interface of the magneto-optical recording layer 13 and the light-permeable metal layer 16, the thermal conductivity of the magneto-optical recording layer 13 is substantially raised.

The thickness of the light-permeable metal layer 16 is 1 nm to 10 nm. If more than 10 nm, the heat diffusion is too large, and a high optical power is needed, or if less than 1 nm, it is hard to obtain the effect of enhancing the thermal conductivity of the magneto-optical recording layer 13 substantially, as known from studies.

The light-permeable metal layer 16 is composed of, depending on the light to be used, Au or Cu, for example, in the case of a red light of a relatively long wavelength, or Al or Ag in the case of blue light of a short wavelength. or other metal may be added to these metals. For example, in order to improve the corrosion resistance, Ti may be added to Al, or Pd and the like may be added to Ag.

Although not shown, a protective film for humidity-proof effect or mechanical protection may be further deposited on the metal reflecting film 15.

From this magneto-optical recording medium, recorded information is read out by a known optical pickup device by irradiating a reproduced light by light L, for example, a red laser light of a relatively long wavelength or, for example, a blue laser light of a short wavelength.

That is, by irradiating this laser light on the magneto-optical recording layer 13, recorded information thereupon, that is, a return light of the reproducing light which is Kerr-rotated depending on the direction of magnetization is detected.

According to the magneto-optical recording medium of the invention, since the light-permeable metal layer 16 of large heat diffusion as compared with the magneto-optical recording layer 13 is disposed adjacent to the magneto-optical recording layer 13, the substantial thermal conductivity of the magneto-optical recording layer is heightened, and when emitting the reproducing light upon this magneto-optical recording layer, the light energy locally absorbed in the magneto-optical recording layer 13 is diffused earlier, and local temperature is avoided from rising . Therefore, the reproducing light intensity can be heightened, and the C/N can be improved.

Also, according to this constitution, since the light-permeable metal layer 16 is disposed between the magneto-optical recording layer 13 and the metal reflecting film 15, the magneto-optical recording medium optically free from deterioration in performance index is realized.

That is, the light-permeable metal layer 16 is formed in a film thickness of less than 10 nm so as to be light permeable, and since this metal layer 16 is made of a metal layer of high reflectivity such as Al or Ag, the reflecting film in a enhancement structure can be considered to be equivalent to a structure divided in two layers, so that the same enhancement effect as in the prior art is obtained.

Described next is an embodiment of a manufacturing method of the magneto-optical recording medium of the invention. In this embodiment, the same as in the magneto-optical recording medium shown in FIG. 1, the light enters from the base material 11 side, and in this case, on the light-permeable base material 11, the light-permeable first dielectric layer 12, magneto-optical recording layer 13, and light-permeable metal layer 16 of 1 nm to 10 nm in thickness and having large heat diffusion as compared with the magneto-optical recording layer 13 are sequentially formed, respectively by a first continuous sputtering process.

Then, by reverse sputtering of the light-permeable metal layer 16, the surface of the light-permeable metal layer 16 is smoothed in a surface treatment process.

Later, the light-permeable second dielectric layer 14 and metal reflecting film 15 are formed sequentially by a second continuous sputtering process.

The first continuous sputtering, reverse sputtering, and second continuous sputtering can be carried out sequentially and continuously in the same sputtering apparatus, without taking out the base material 11 from the apparatus.

Thus, according to the manufacturing method of the invention, since forming of the first dielectric layer 12, magneto-optical recording layer 13, light-permeable metal layer 16, second dielectric layer 14, and reflecting film 15, and surface smoothing treatment of the light-permeable metal layer 16 can be done in a series of operation, complication of operation due to provision of the light-permeable metal layer 16 and its surface treatment can be avoided.

In the embodiment of the invention, as shown in FIG. 1, the base material 11 is composed of a transparent substrate, and the light is emitted from this base material 11 side, but in other embodiment, moreover, the light may be emitted, for example, reproducing light may be emitted, from the opposite side of the base material 11.

Figure 2:
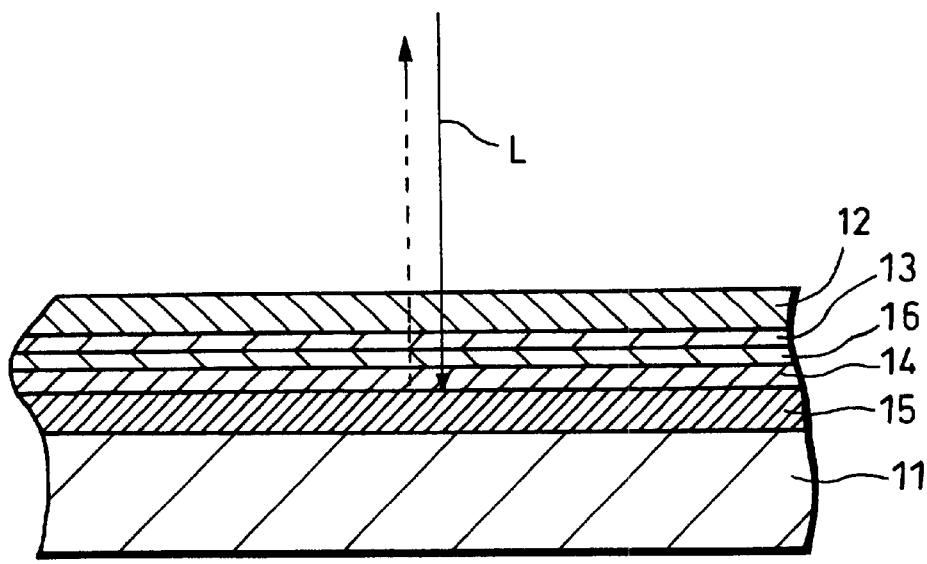
FIG. 2 is a schematic sectional view of another example of the magneto-optical recording medium according to the invention.

FIG. 2 shows a schematic sectional view of one example of this case, and in this embodiment, too, it is not limited to this example alone.

In FIG. 2, same reference numerals are given to the corresponding parts in FIG. 1. In this example, the base material 11 is not limited to a light-permeable base material, and on this base material 11, the metal reflecting layer 15, second dielectric layer 14, light-permeable metal layer 16, magneto-optical recording layer 13, and first dielectric layer 12 are formed.

In. the magneto-optical recording medium of this constitution, the light L is entered from the opposite side of the base material 11.

In this embodiment of the manufacturing method of the magneto-optical recording medium of the invention, on the base material 11, the metal reflecting film 15, second dielectric film 14, and light-permeable metal layer 16 are sequentially formed by first continuous sputtering process.

Then, by reverse sputtering of the light-permeable metal layer 16, the surface of the light-permeable metal layer 16 is smoothed by the surface treatment process.

Later, the magneto-optical recording layer 12 and first dielectric layer 12 are formed on the light-permeable metal layer 16 sequentially by second continuous sputtering process.

In this cases, too, the first continuous sputtering, reverse sputtering, and second continuous sputtering can be carried out sequentially and continuously in the same sputtering apparatus, without taking out the base material from the apparatus.

Thus, since the first continuous sputtering process, surface smoothing process of light-permeable metal layer 16, and second continuous sputtering process can be done in a series of operation, complication of operation due to provision of the light-permeable metal layer 16 and its surface treatment can be avoided.

The specific structures of the magneto-optical recording medium of the invention and the conventional magneto-optical recording medium, and their characteristics are comparatively explained below.

The magneto-optical recording medium of the invention is constituted as shown in FIG. 1, in which a first dielectric layer of SiN in a thickness of 49 nm, a magneto-optical recording layer of TbFeCo in a thickness of 15 nm, a light-permeable metal layer of Ag in a thickness of 5 nm, a second dielectric layer of SiN in a thickness of 10 nm, and a metal reflecting layer of Ag in a thickness of 100 nm are sequentially laminated on a glass base material (hereinafter the magneto-optical recording medium of this constitution is called sample 1).

Figure 5:
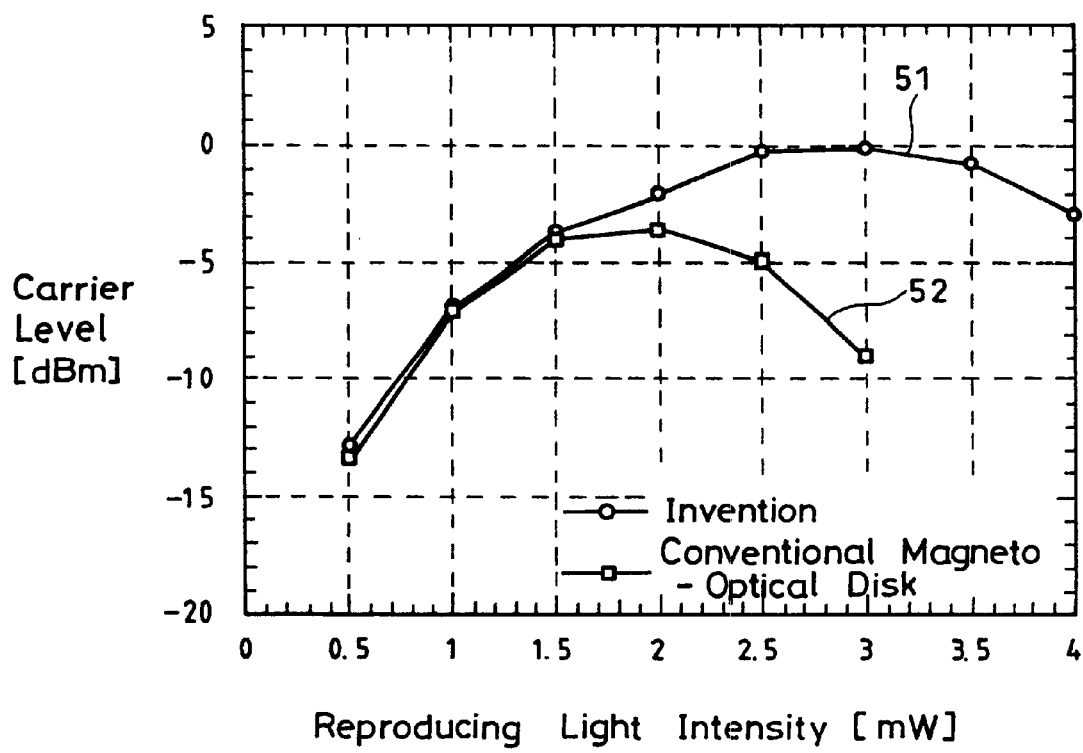
FIG. 5 is a reproduction characteristic diagram of magneto-optical recording medium according to the invention and a conventional magneto-optical recording medium.

As the conventional structure, on the base material constituted as shown in FIG. 5, a first dielectric layer of SiN in a thickness of 51 nm, a magneto-optical recording layer of TbFeCo in a thickness of 15 nm, a second dielectric layer of SiN in a thickness of 10 nm, and a metal reflecting layer of Ag in a thickness of 100 nm are sequentially laminated (hereinafter the magneto-optical recording medium of this constitution is called sample 2).

The wavelength of the light to be used in these magneto-optical recording media is 400 nm.

In this case, the optical constants (refractive index n, extinction factor k) of the constituent materials of the layers for forming these magneto-optical recording media are the values as shown in Table 1. In this case, the wavelength of the light to be used is 400 nm. Herein, n+ and k+ show the refractive index and extinction factor of the clockwise circularly polarized light, and n− and k− are the refractive index and extinction factor of the counterclockwise circularly polarized light.

TABLE 1

Optical constants in the case of wavelength of 400 nm

| Material | Refractive index n | Extinction factor k |
|---|---|---|
| TbFeCo | N+: 2.2245 | K+: 2.9769 |
|  | n−: 2.2413 | k−: 3.0280 |
| Ag | 0.173 | 1.95 |
| SiN | 2.0 | 0 |

Table 2 shows the results of enhancement calculation at wavelength of 400 nm in these samples 1 and 2. It is known from this table that sample 1 of the invention is equivalent in characteristics to sample 2 of the prior art.

TABLE 2

Enhancement calculation at wavelength of 400 nm

| Sample No. | Reflectivity (%) | Kerr rotational angle θκ(°) | Kerr elliptic rate (°) |
|---|---|---|---|
| Sample 1 (invention) | 15.0 | 0.845 | 0.298 |
| Sample 2 (prior art) | 14.9 | 0.845 | 0.330 |

In sample 1, when the film thickness and magneto-optical recording layer material are changed, the same optical characteristics as in sample 2 similarly changed in the film thickness and magneto-optical recording layer material are obtained, and it is known that the performance index (R·θ$_K$) is maintained.

The structure of the invention in which the wavelength of the light is 650 nm is compared with the conventional structure in the characteristics of the magneto-optical recording medium.

The magneto-optical recording medium of the invention is as shown in FIG. 1, and in this case, the first dielectric layer of SiN in a thickness of 73 nm, magneto-optical recording layer of TbFeCo in a thickness of 15 nm, light-permeable metal layer of Ag in a thickness of 5 nm, second dielectric layer of SiN in a thickness of 20 nm, and metal reflecting film of Ag in a thickness of 100 nm are sequentially laminated on the base material (the magneto-optical recording medium of this structure is hereinafter called sample 3).

Figure 6:
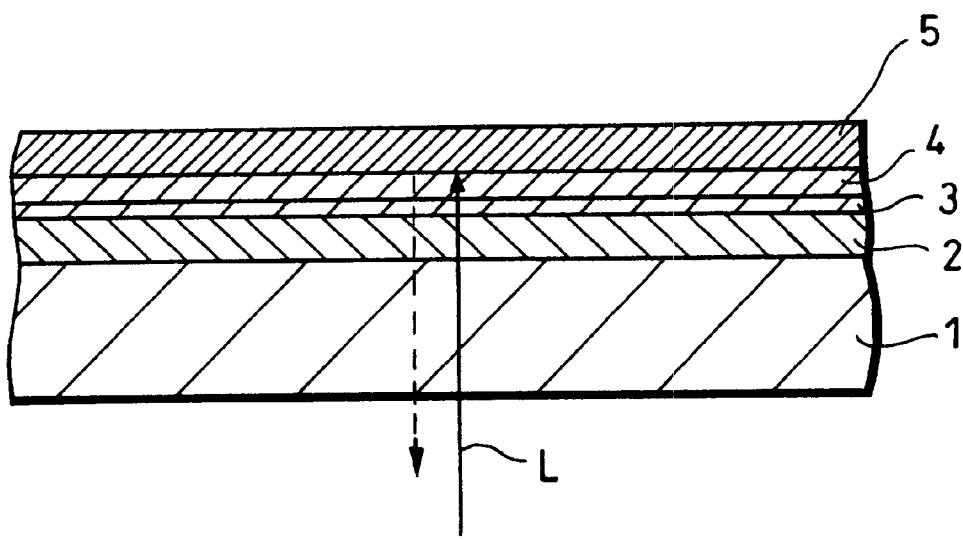
FIG. 6 is a schematic sectional view of the conventional magneto-optical recording medium.

As the conventional structure, on the base material shown in FIG. 6, the first dielectric layer of SiN in a thickness of 83.5 nm, magneto-optical recording layer of TbFeCo in a thickness of 15 nm, second dielectric layer of SiN in a thickness of 20 nm, and metal reflecting film of Ag in a thickness of 100 nm are sequentially laminated (the magneto-optical recording medium of this structure is hereinafter called sample 4).

The optical constants (refractive index n, extinction factor k) of constituent materials of the layers composing these magneto-optical recording media are shown in Table 3.

TABLE 3

Optical constants in the case of wavelength of 650 nm

| Material | Refractive index n | Extinction factor k |
|---|---|---|
| TbFeCo | N+: 3.1331 | K+: 3.7123 |
|  | n−: 3.2080 | k−: 3.7919 |
| Ag | 0.131 | 3.88 |
| SiN | 2.0 | 0 |

Table 4 shows the results of enhancement calculation at wavelength of 650 nm in these samples 3 and 4. It is known from this table that sample 3 of the invention is equivalent in characteristics to sample 4 of the prior art.

TABLE 4

Enhancement calculation at wavelength of 650 nm

| Sample No. | Reflectivity (%) | Kerr rotational angle θκ(°) | Kerr elliptic rate (°) |
|---|---|---|---|
| Sample 3 (invention) | 15.0 | 1.379 | −0.127 |
| Sample 2 (prior art) | 15.0 | 1.390 | −0.081 |

In this case, too, sample 3 of the invention is proved to be equivalent to sample 4 of the conventional structure in terms of optical characteristics, that is, the performance index (R·θ$_K$).

Thermal properties are explained. In this case, it is difficult to measure the thermal conductivity and hard to obtain reliability in measured data, and therefore the changes of thermal characteristics are shown by the actual measured data in the magneto-optical evaluating machine.

The evaluation system is characterized by the numerical aperture of N.A.=0.55, light wavelength of 680 nm, track pitch of 0.85 μm, recording mark length of 1.87 μm, and linear velocity of 4.2 m/sec. This evaluation system is used for showing only changes of thermal characteristics, but in other N.A. or light wavelength, it is considered that the thermal characteristics change similarly.

The magneto-optical recording layer materials used herein were Tb(Fe$_{90}$Co$_{10}$) and Tb(Fe$_{85}$Co$_{15}$). In these materials, as the ratio of Co in composition is higher, the Curie temperature is higher, and a higher recording light intensity is needed.

In this case, the light-permeable metal layer of Ag is disposed in contact with the magneto-optical recording layer.

Figure 3:
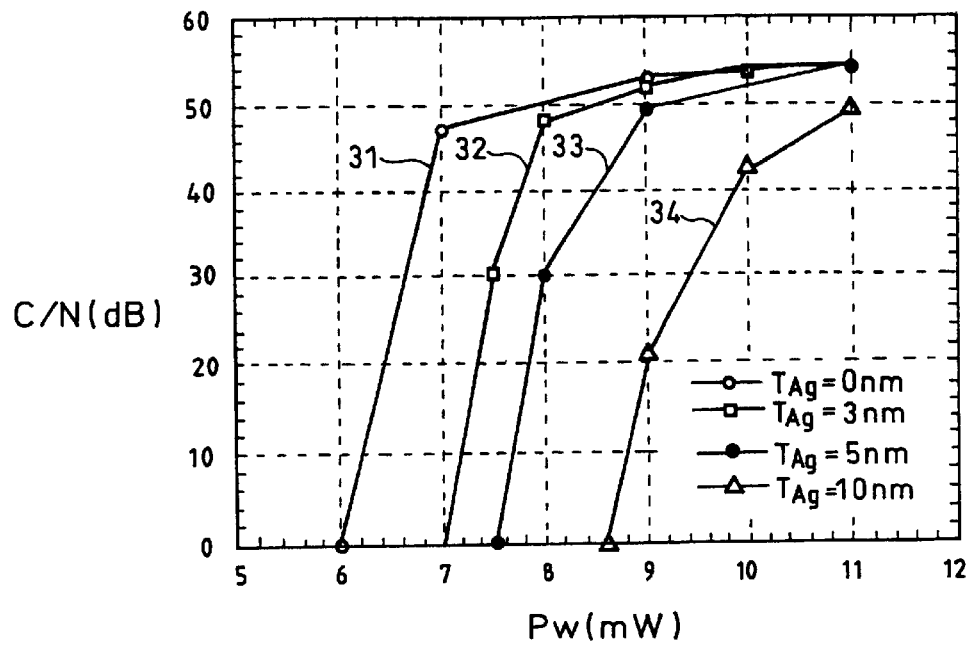
FIG. 3 is a recording characteristic diagram explaining the magneto-optical recording medium according to the invention.
Figure 4:
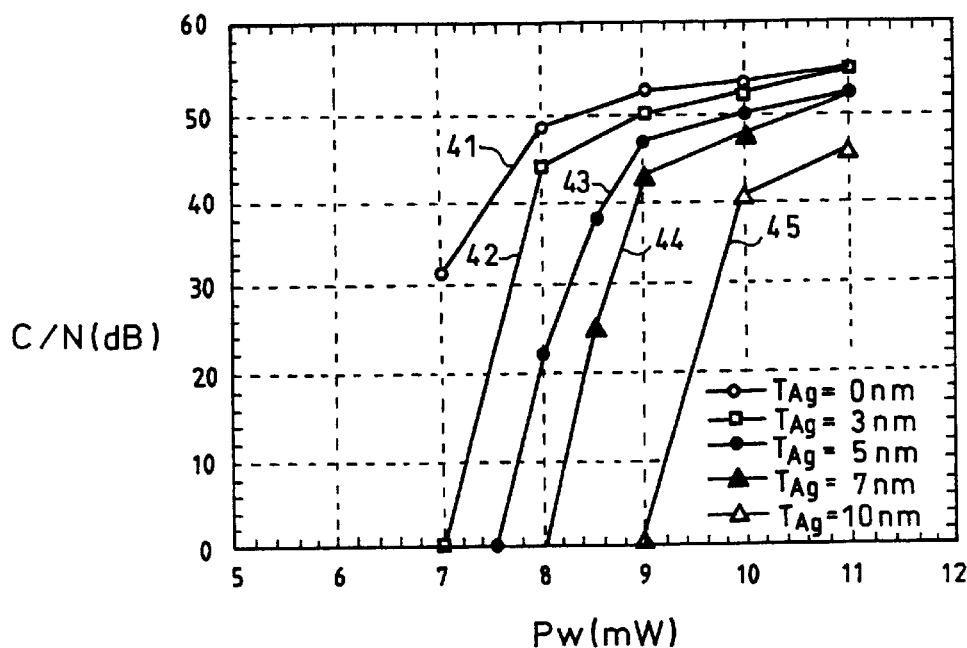
FIG. 4 is a recording characteristic diagram explaining the magneto-optical recording medium according to the invention.

FIG. 3 and FIG. 4 show the recording characteristics, that is, the measured results of the relations between C/N and recording power Pw when the film thickness T$_{Ag}$ of the light-permeable metal layer of Ag is changed by using Tb(Fe$_{90}$Co$_{10}$) and Tb(Fe$_{85}$Co$_{15}$). Curves 31, 32, 33 and 34 in FIG. 3 correspond respectively to T$_{Ag}$=0, T$_{Ag}$=3 nm, T$_{Ag}$=7 nm and T$_{Ag}$=10 nm, and curves 41, 42, 43, 44 and 35 in FIG. 4 correspond respectively to T$_{Ag}$=0, T$_{Ag}$=3 nm, T$_{Ag}$=5 nm, T$_{Ag}$=7 nm and T$_{Ag}$=10 nm.

Accordingly, as the film thickness of the light-permeable metal layer increases, the recording power Pw becomes higher and the recording sensitivity declines, but at the thickness of less than 10 nm, recording is sufficiently possible, and C/N hardly deteriorates. It is hence evident that Tb(Fe$_{90}$Co$_{10}$) and Tb(Fe$_{85}$Co$_{15}$) show the same value of C/N.

Herein, as explained in the manufacturing method of the invention, the surface of the light-permeable metal layer is smoothed by reverse sputtering, and without this process of reverse sputtering, the maximum was 50 dB or less in the same condition of experiment.

It therefore proves the effectiveness of smoothing treatment by etching by reverse sputtering and the like of the surface of the light-permeable metal layer as in the manufacturing method of the invention.

Moreover, according to the magneto-optical recording medium of the invention as mentioned above, in contact with the magneto-optical recording layer 13, by disposing the light-permeable metal layer 16 having larger heat diffusion than it, the reproducing light intensity can be enhanced while avoiding local temperature rise due to irradiation of reproducing light, and the C/N is improved, which is further described below on the basis of the data of the experiment.

FIG. 5 shows measured results of reproducing characteristics of magneto-optical disks of the invention and the prior art, in which curve 51 represents the reproducing characteristic of the magneto-optical disk in sample 1 according to the structure of the invention explained above, and curve 52 shows the reproducing characteristic of the magneto-optical disk in sample 2 of the conventional structure.

The reproducing characteristic is the result of measurement by reducing the spot size of the reproduced light in the optical system (objective lens) with the N.A. of 0.6 within a general conventional range of 0.4 to 0.6, by using the blue laser light of a short wavelength (wavelength 407 nm), and this is the magnetic field modulation recording at the mark length of 0.33 μm and linear velocity of 5 m/sec.

As a result, in the conventional structure, the carrier level is lowered at the reproducing light intensity of 2 mW or more, whereas the carrier level is improved in the structure of the invention.

Incidentally, when the N.A. was 0.9, larger than the general conventional value, and by using the red laser light of a long wavelength (wavelength 680 nm) as the reproducing light, nearly same effects as in FIG. 5 were obtained.

Further, when the spot size of the reproducing light was reduced, for example, in the case of N.A. of 0.9 and blue laser light of a short wavelength (wavelength 407 nm), the magneto-optical disk of the conventional structure was evidently lowered in the carrier level due to increase of the reproducing light intensity further as compared with the curve 52 in FIG. 5.

By contrast, in the magneto-optical disk of the invention, a notable decline in carrier level was not recognized.

That is, as clear from the curve 52 in FIG. 5, in the conventional magneto-optical disk, when reproducing the signal recorded therein by a light spot of a reduced diameter, the carrier level tends to decline with a certain reproducing light intensity as a water-shed as the light intensity is raised. Or as the light spot size is reduced, the reproducing light intensity at which the carrier level is maximum is lowered due to the local temperature rise.

Therefore, the light intensity in reproduction is preferred to be set at a lower level than the maximum point of the carrier level.

Incidentally, the quality of a signal should be expressed by the ratio of the carrier level to the noise level occurring in the reproduction system, that is, C/N, which is explained below.

As the light spot size becomes smaller the local temperature rises, and hence the carrier level is not raised sufficiently, and when using the light source of a short wavelength, in addition, the Kerr effect in the magneto-optical recording layer and the sensitivity of the detector are lowered. Accordingly, in the system of the reduced light spot size, as compared with the general conventional magneto-optical disk system, the carrier level is lower, and the shot noise level and amplifier noise elevate relatively, thereby incurring a declining C/N.

Therefore, when using the light source of the short wavelength, it is required to heighten the carrier level by raising the reproduction intensity as much as possible, but according to the structure of the invention, as shown in FIG. 5, the reproducing light intensity for obtaining a high carrier level is heightened as compared with the conventional structure, and the carrier level is improved by about 4 dB, so that the C/N can be raised ultimately.

In the conventional structure, incidentally, if the film thickness of the metal reflecting layer 5 was increased, the known tendency was hardly changed.

In other words, the effect of the structure of the invention on adjustment of sensitivity by disposing the metal layer in contact with the magneto-optical recording layer is outstanding.

In the illustrated embodiment, the magneto-optical recording layer, and the first and second dielectric layers are respectively formed in a single layer structure, but not being limited to this example, the invention includes multi-layer structure and composition by other materials.

In the magneto-optical recording medium of the invention, as described herein, by disposing the light-permeable metal layer of larger heat diffusion as compared with the magneto-optical recording layer in contact with this magneto-optical recording layer, the substantial thermal conductivity of the magneto-optical recording layer is heightened, and therefore when the magneto-optical recording layer is illuminated with the reproducing light, the light energy locally absorbed in the magneto-optical recording layer spreads quickly, and the local temperature is avoided from rising. As a result, the reproducing light intensity is heightened, and the S/N and C/N can be improved.

On the other hand, this light-permeable metal layer is disposed at the opposite side of the light incidence side of the magneto-optical recording layer, and therefore, as mentioned above, the performance index does not deteriorate optically, so that both optical characteristics and thermal properties can be satisfied simultaneously.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A magneto-optical recording medium, comprising:
   a light-permeable first dielectric layer;
   a magneto-optical recording layer disposed against the light-permeable first dielectric layer;
   a light-permeable metal layer of 1 nm to 10 nm in thickness disposed against the magneto-optical recording layer and having larger heat diffusion as compared with the magneto-optical recording layer;
   a light-permeable second dielectric layer disposed against the light-permeable metal layer; and
   a metal reflecting layer disposed against the light-permeable second dielectric layer.

2. The magneto-optical recording medium of claim 1, wherein the light-permeable metal layer is made of Au or Cu.

3. The magneto-optical recording medium of claim 1, wherein the light-permeable metal layer is made of Al or Ag.

4. A method of manufacturing a magneto-optical recording medium, comprising:
   sequentially forming on a light-permeable base material, a light-permeable first dielectric layer, a magneto-optical recording layer, and a light-permeable metal layer of 1 nm to 10 m in thickness and having larger heat diffusion as compared with the magneto-optical recording layer;
   smoothing a surface of the light-permeable metal layer; and forming a light-permeable second dielectric layer on the light-permeable metal layer and a metal reflecting layer on the light-permeable second dielectric layer, wherein the magneto-optical recording medium is configured to receive light against the metal reflecting layer from the light-permeable base material.

5. A method of manufacturing a magneto-optical recording medium, comprising:

forming a metal reflecting layer, a light-permeable second dielectric layer, and a light-permeable metal layer sequentially on a base material;

smoothing a surface of the light-permeable metal layer; and forming a magneto-optical recording layer on the light-permeable metal layer and a light-permeable first dielectric layer on the magneto-optical recording layer, wherein the light-permeable metal layer is made of a metal film of 1 nm to 10 nm in thickness and having larger heat diffusion as compared with the magneto-optical recording layer, and wherein the metal reflecting layer is configured to block light from the light-permeable base material.

6. The method of manufacturing a magneto-optical recording medium of claim 4, wherein each layer is formed by sputtering, and smoothing the surface of the light-permeable metal layer comprises reverse sputter.

7. The method of manufacturing a magneto-optical recording medium of claim 5, wherein each layer is formed by sputtering, and said surface smoothing the surface of the light-permeable metal layer comprises reverse sputtering.

* * * * *